(12) United States Patent
Cheng (10) Patent No.: US 7,367,687 B2
(45) Date of Patent: May 6, 2008

(54) ILLUMINATION SYSTEM

(75) Inventor: Chuan-Te Cheng, Miao-Li County (TW)

(73) Assignee: Coretronic Corporation, Miao-Li County (TW)

( * ) Notice: Subject to any disclaimer, the term of this patent is extended or adjusted under 35 U.S.C. 154(b) by 0 days.

(21) Appl. No.: 11/465,289

(22) Filed: Aug. 17, 2006

(65) Prior Publication Data

US 2007/0139933 A1 Jun. 21, 2007

(30) Foreign Application Priority Data

Dec. 21, 2005 (TW) ............................... 94145501 A (51) Int. Cl.
*F21V 7/04* (2006.01)
*F21V 13/00* (2006.01)
*G02B 5/10* (2006.01)

(52) U.S. Cl. ...................... 362/247; 362/243; 362/298; 359/858

(58) Field of Classification Search ................ 362/241, 362/238, 298, 341, 247, 303, 346, 227, 235, 362/236, 237, 240, 248, 257, 261, 263, 264, 362/294, 296, 302, 327, 345, 228, 229, 616, 362/297, 242, 243; 353/85, 94, 98, 99, 119; 359/857–868, 850, 728

See application file for complete search history.

(56) References Cited

U.S. PATENT DOCUMENTS

| | | | | |
|---|---|---|---|---|
| 5,829,852 A * | 11/1998 | Jung | ............................ | 353/20 |
| 6,231,199 B1 * | 5/2001 | Li | ............................... | 359/857 |
| 6,527,420 B1 * | 3/2003 | Chuang | ...................... | 362/346 |
| 6,547,422 B2 * | 4/2003 | Tiao et al. | ................... | 362/298 |
| 6,857,761 B2 * | 2/2005 | Chang | ........................ | 362/234 |
| 7,033,056 B2 * | 4/2006 | Andersen et al. | ........... | 362/554 |
| 2005/0083685 A1 * | 4/2005 | Yeh et al. | .................... | 362/227 |
| 2006/0044833 A1 * | 3/2006 | Li | ............................... | 362/616 |

* cited by examiner

Primary Examiner—Jong-Suk (James) Lee
Assistant Examiner—David R Crowe
(74) Attorney, Agent, or Firm—J.C. Patents (57) ABSTRACT

An illumination system is for providing a parallel illumination light beam. The illumination system includes two lamps, and each lamp includes a first lampshade, a burner and a reflector. The lampshade has a light outputting section. A first reflector is connected with the first lampshade, and a portion of the light outputting section is covered by the first reflector. A diverging light is provided by the burner. The diverging light is transformed into a parallel light beam by the lampshade and the first reflector, and the parallel light beam is outputted from a portion of the light outputting section without covering. The illumination system further includes at least one second reflector disposed between the lamps, on the optical path of at least one portion of the parallel light beam. The parallel light beams from the lamps are thereby combined into a parallel illumination beam by the second reflector.

6 Claims, 6 Drawing Sheets

FIG. 6

ILLUMINATION SYSTEM

CROSS-REFERENCE TO RELATED APPLICATION

This application claims the priority benefit of Taiwan application serial no. 94145501, filed Dec. 21, 2005. All disclosure of the Taiwan application is incorporated herein by reference.

BACKGROUND OF THE INVENTION

1. Field of Invention

The present invention relates to an illumination system. More particularly, the present invention relates to an illumination system with multiple lamps.

2. Description of Related Art

Figure 1:
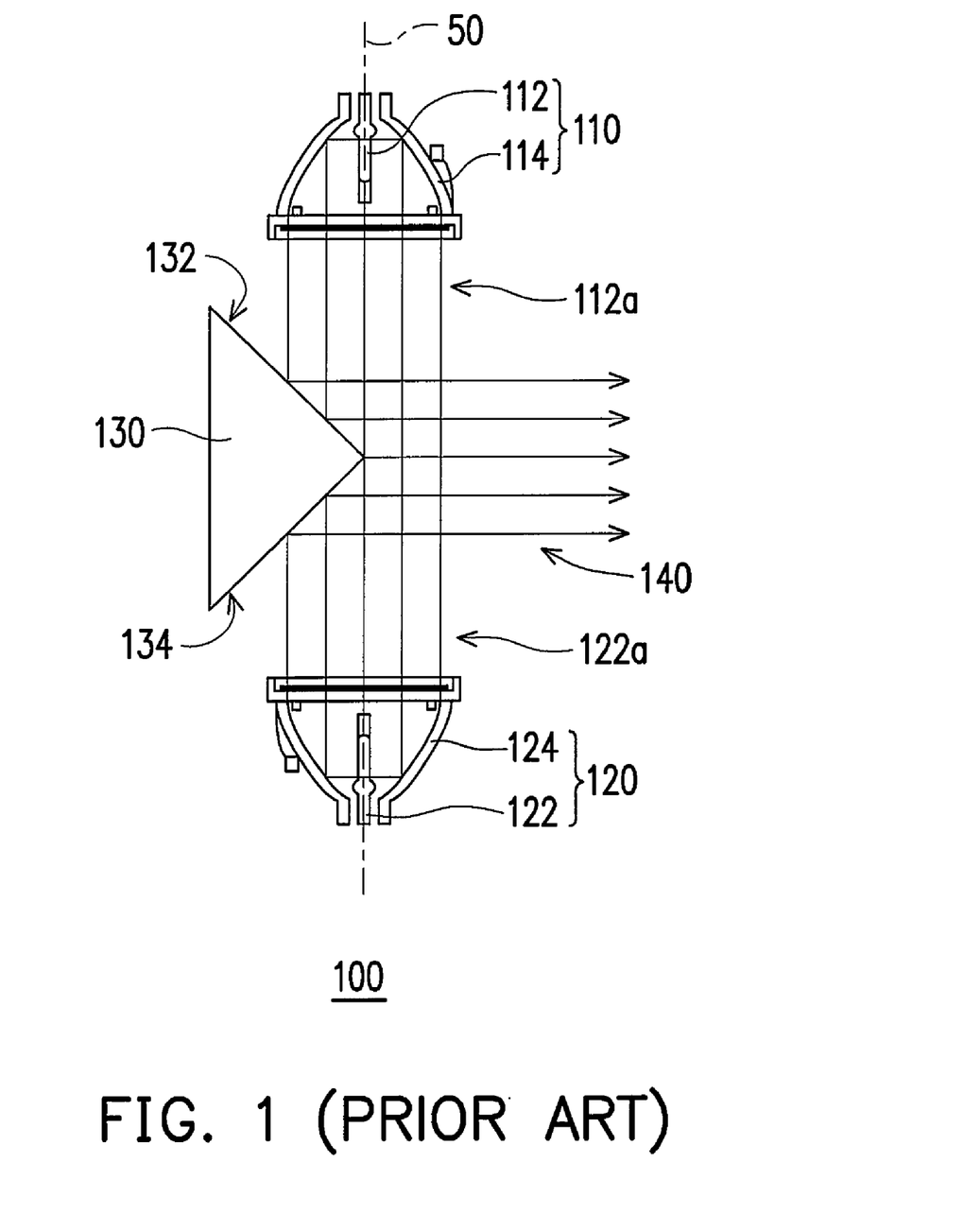
FIG. 1 is a schematic illustration showing a convention dual-lamp illumination system.

Referring to FIG. 1, the conventional dual-lamp illumination system 100 includes a first lamp 110, a second lamp 120, and a reflector 130. The first lamp 110 and the second lamp 120 are in opposite positions. The reflector 130 is disposed between the first lamp 110 and the second lamp 120. The reflector 130 has two reflection surfaces 132 and 134, each of which has an included angle of 45 degrees with respect to an axis 50.

The first lamp 110 and the second lamp 120 respectively include the burners 112 and 122 and the parabolic lampshades 114 and 124. The burners 112 and 122 provide diverging lights and are disposed at the same axis 50. The parabolic lampshades 114 and 124 are used to form the parallel light beams 112a and 122a. Optical paths of the parallel light beams 112a and 122a are parallel to the axis 50. In addition, a portion of the parallel light beams 112a and 122a forms a combined light beam 1440 by reflecting from the reflection surfaces 132 and 134 of the reflector 130. Another portion of the parallel light beams 112a and 122a not being reflected by the reflector 130 is reflected to the reflector 130 by the parabolic lampshades 124 and 114, and then is combined into the combined light beam 140 by reflection from the reflection surfaces 134 and 132.

In the foregoing dual-lamp illumination system 100, since the parallel light beams 112a and 122a directly illuminate the lamps 120 and 110, respectively, and again pass the burners 112 and 122, it easily causes a damage on the burners 112 and 122 due to overheat. In addition, since the parallel light beams 112a and 122a, formed from the parabolic lampshades 124 and 114, are gradually divergent and the optical path is rather long, the light condensing efficiency is poor, resulting in a decrease of intensity of illuminating light provided by the dual-lamp illumination system 100. In addition, the dual-lamp illumination system 100 arranges the first lamp 110 and the second lamp 120 in opposite position, and uses the reflector 130 between first lamp 110 and the second lamp 120 for combining the light. Therefore, it needs a rather larger space to adapt the structure, and the volume of a projecting apparatus would be rather large. This dual-lamp illumination system 100 does not satisfy the request of the present design principle under the trend being small and light for the present electronic product.

SUMMARY OF THE INVENTION

The invention provides an illumination system, capable of reducing the probability of damage on the lamp.

The invention provides an illumination system, capable of providing a parallel light bean with better intensity.

The invention provides an illumination system, suitable for providing a parallel light beam. The illumination system includes two first lamps, and each of the first lamps includes a first lampshade, a first burner and a first reflector. The first lampshade has a first light outputting section. The first reflector is connected with the first lampshade, and a portion of the first light outputting section is covered by the first reflector. The first burner provides a first diverging light. The first diverging light is transformed into a first parallel light beam by the first lampshade and the first reflector, and the first parallel light beam is emitted from a portion of the first light outputting section without covering. Moreover, the illumination system further includes at least one second reflector disposed between the first lamps and disposed on the optical path of at least one portion of the first parallel light beams. The first parallel illumination light beams from the first lamps are thereby combined to form a parallel illumination beam. The illumination system further includes, for example, at least one second lamp and at least one third reflector. The second lamp is disposed at least between one of the first lamps and the second reflector. The second lamp includes a second lampshade and a second burner. The second lampshade has a second light outputting section and the second burner is disposed in the second lampshade. The second burner is suitable for providing a second diverging light, and the second lampshade is suitable for transforming the second diverging light into a second parallel light beam. In addition, the third reflector is disposed in front of the second light outputting section of the second lamp. A portion of the second parallel light beam is reflected by the third reflector to one of the first lampshades, and another portion of the second parallel light beam propagates to the second reflector. In addition, a portion of the first parallel light beam is reflected by the third reflector and the second lampshade to the second reflector.

The present invention further provides an illumination system, suitable for providing a parallel illumination beam. The illumination system includes two first lamps, and a reflector between the two lamps. Each of the lamps includes a lampshade, a burner, and a light covering member. The lampshade has a light outputting section and the burner is disposed inside the lampshade. The light covering member encloses a portion of the burner. The burner can provide a diverging light and the lampshade can transform the diverging light into a parallel light beam. The parallel light beam is output from a portion of the light outputting section. In addition, the reflector is disposed in front of one of the lamps, so as to cause the parallel light beams from the lamps to be combined into a parallel illumination beam.

Since the invention uses the reflector and/or the light covering member to absorb a portion of energy of ultraviolet light and infrared light in the lampshade, it reduces the probability of damage on the burner due to overheat. In addition, since the length of the optical path is shorter, the light is not easily diverged, and the light condensing efficiency is improved, so as to increase the intensity of the parallel illumination beam, which is provided by the illumination system.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

First Embodiment

Figure 2:
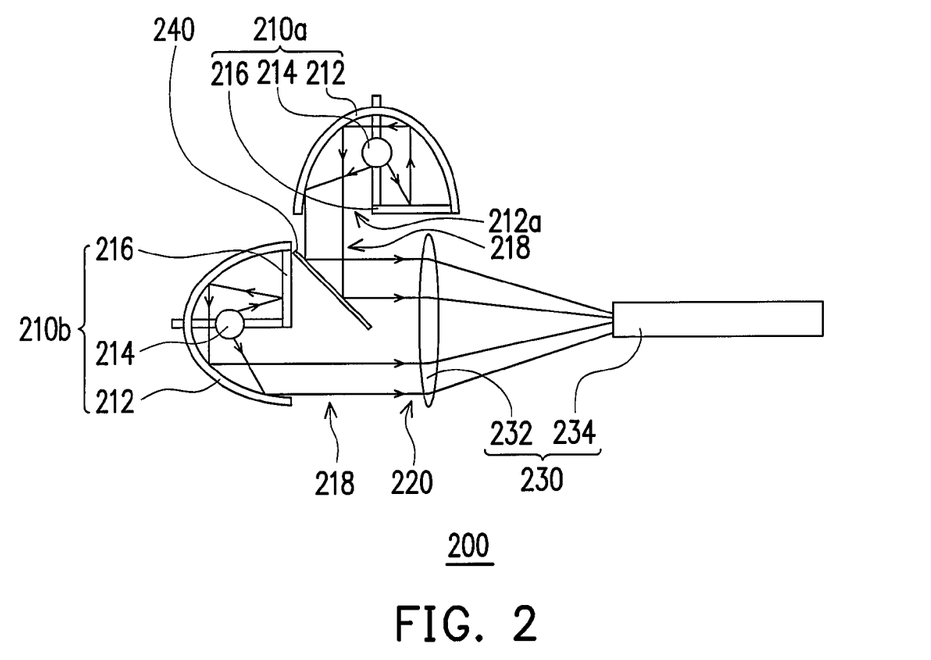
FIG. 2 is a schematic illustration showing a structure of an illumination system according to a first embodiment of the invention.

Referring to FIG. 2, the illumination system 200 of the embodiment includes two first lamps 210a and 210b, and a second reflector 240, wherein the second reflector 240 is disposed between the first lamp 210a and the first lamp 210b. Each of the first lamps 210a and 210b includes a first lampshade 212, a first burner 214, and a first reflector 216. The axes of the first burners 214 of the first lamps 210a and 210b are perpendicular to each other. The first lamp 212 has a first light outputting section 212a. The first reflector 216 is connected with the first lampshade 212 and covers a portion of the light outputting section 212a. The first burner 214 provides a first diverging light. The first lampshade 212 and the first reflector 216 are suitable for transforming the diverging light into a first parallel light beam 218. The first parallel light beam 218 is emitted from a portion of the first light outputting section 212a without covering by the first reflector 216. In addition, the second reflector 240 is disposed in front of the light outputting section 212a of one of the first lamps, such as the first lamp 210a, so as to reflect the parallel light beam 218 from the first lamp 210a, and combine the first parallel light beam 218 from another lamp 210b into a parallel illumination beam 220.

The first reflector 216 is, for example, covering half of the first light outputting section 212a. The first reflectors 216 are, for example, cold mirrors, which reduce energy of ultraviolet light and infrared light in the diverging lights, so as to reduce the temperature inside the lampshade 212. As a result, it reduces the probability of damaging the first burner 214 due to overheat. In addition, in the embodiment, a light condenser 230 is disposed at an optical path of the parallel light beam 220, so as to transform the parallel light beam 220 into a focused illumination beam. The light condenser 230 is, for example, a lens 232, an optical integration rod 234 or a combination thereof.

The second reflector 240 is, for example, a mirror. The mirror is a cold mirror, which reduces the energy of ultraviolet light and infrared light in the parallel light beam 218, so as to reduce the temperature of the whole illumination system 200. In addition, the second reflector 240 is, for example, a dichroic mirror, used to adjust the color temperature of the parallel light beam 218. In addition, the prism is also be used as the second reflector 240.

Since an arranging location of the first lamps 210a and 210b in the first embodiment is rather compact, the structure of the whole illumination system 200 is relatively small. This reduces a volume of the projection apparatus, which has used the illumination system 200, so as to satisfy the trend being light and thin for the electronic products. In addition, since the structure of the whole illumination system 200 is relatively small, a length of the optical path of the first parallel light beam 218 is relatively small, the divergence is not easily occurring. This increases the light condensing efficiency of the first parallel light beam 218, so as to form the parallel illumination beam 220 with improved intensity.

Figure 3:
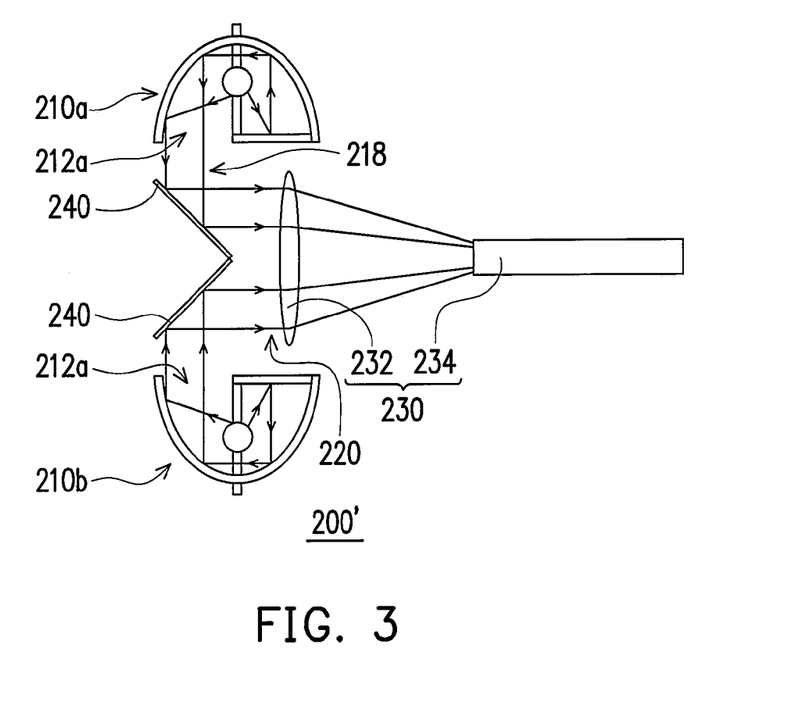
FIG. 3 is a schematic illustration showing another structure of an illumination system according to the first embodiment of the invention.

Referring to FIG. 2 and FIG. 3, the illumination system 200' is similar to the illumination system 200. The difference is that the illumination system 200 has one second reflector 240 but that the illumination system 200' has two reflectors 240, and the axes of the first lamps 210a, 210b and the first burner 214 are disposed at the same axis. In further detail, the reflectors 240 are disposed between the first lamp 210a and the first lamp 210b, and are respectively disposed in front of the first light outputting sections 212a of the first lamp 210a and the first lamp 210b. The second reflectors 240 reflect the first parallel light beams 218 from the first lamps 210a and 210b. The first parallel light beams 218 from the first lamps 210a and 210b combine into a parallel illumination beam 220 after being reflected by the second reflectors 240.

Since both the first parallel light beams 218 from the first lamps 210a and 210b are reflected by the second reflector 240, the second reflector 240 includes the cold mirror to suppress the energy of the ultraviolet light and the infrared light in the first parallel light beams 218. As a result, the illumination system 200' is in lower temperature. Alternatively, the second reflector 240 includes the dichroic mirror to adjust the color temperature of the first parallel light beam 218 from the first lamps 210a and 210b.

Figure 4A:
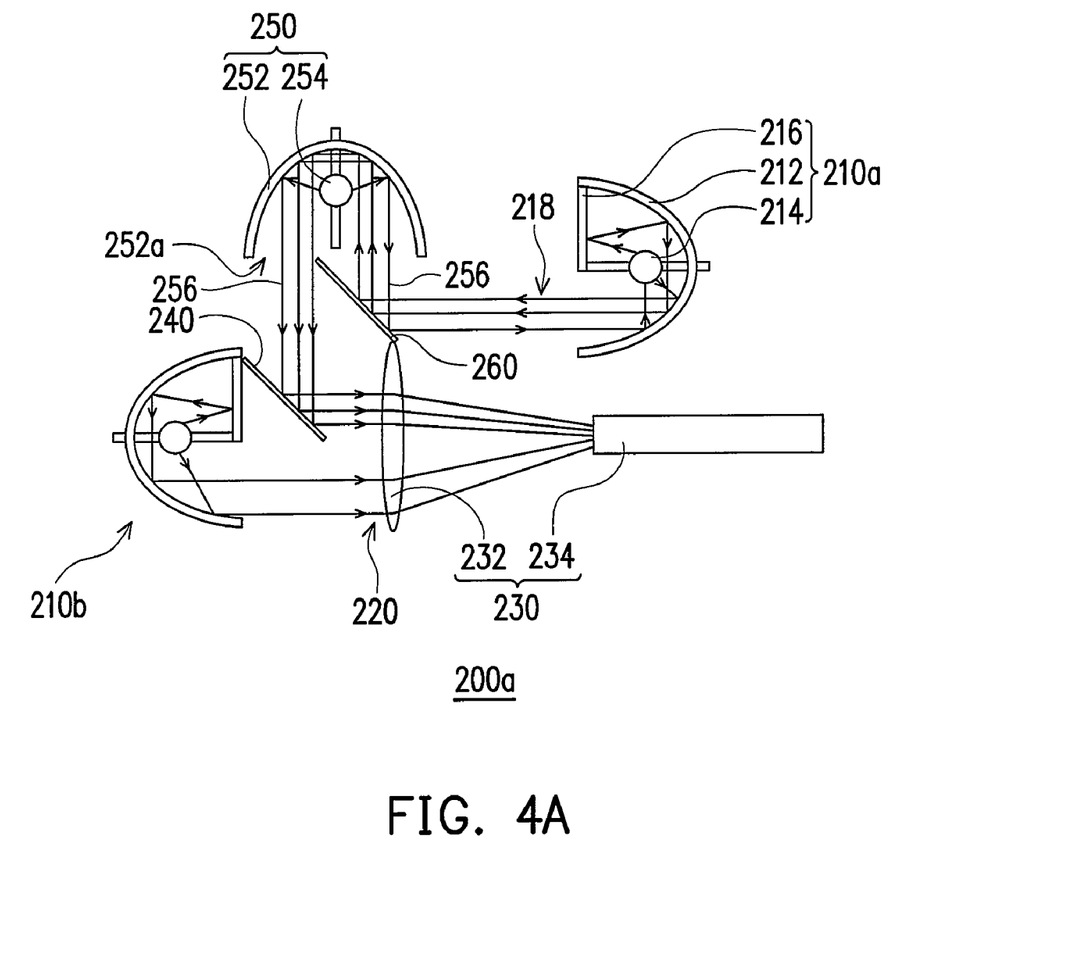
FIGS. 4A and 4B are schematic illustrations showing farther another two structures of an illumination system according to the first embodiment of the invention.
Figure 4B:
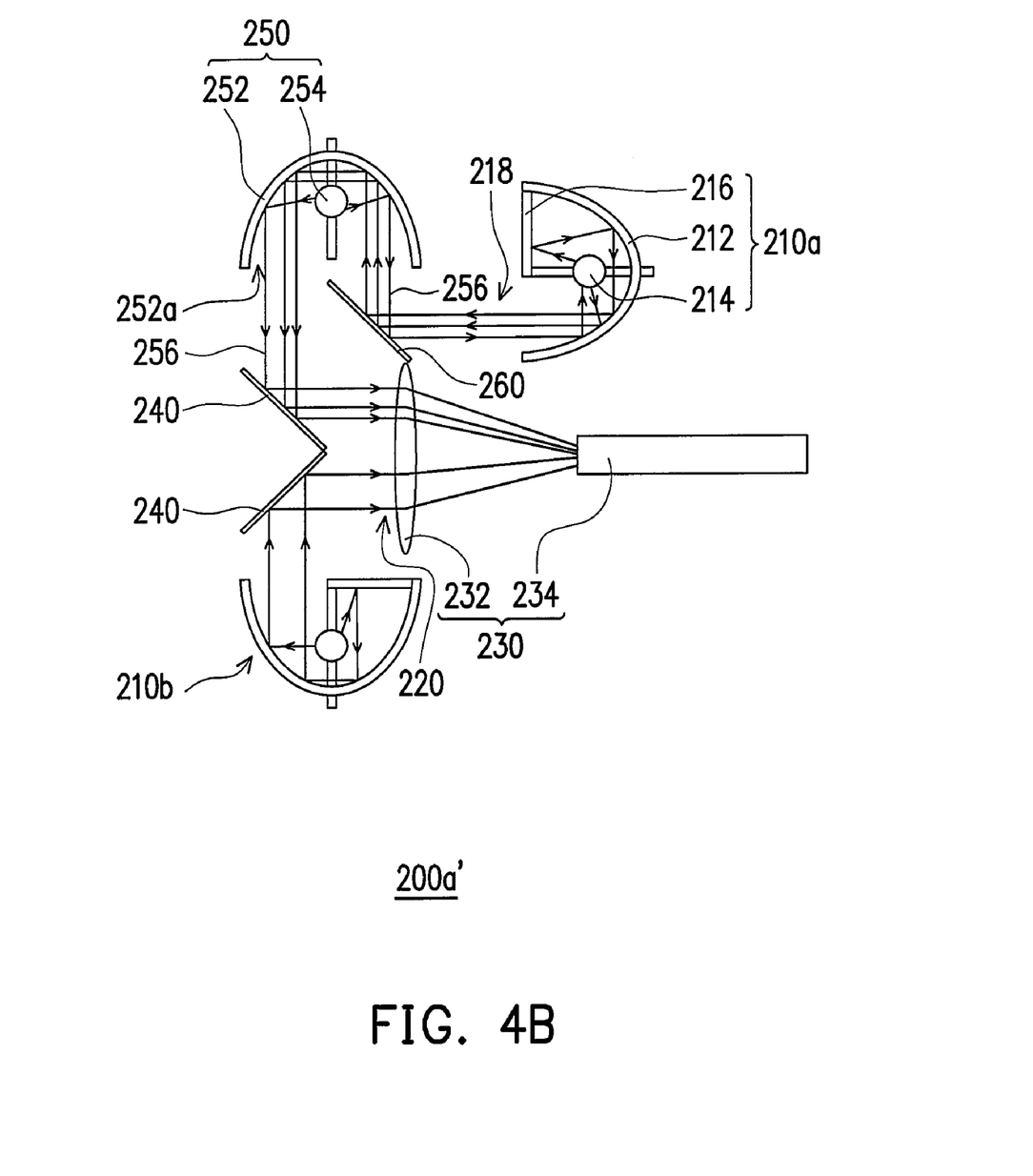

Referring to FIG. 4A and FIG. 4B, respectively comparing with the illumination system 200 (shown in FIG. 2) and 200' (shown in FIG. 3), illumination systems 200a and 200a' of the embodiment further respectively include a second lamp 250 and a third reflector 260. The second lamp 250 is disposed between one of the first lamps, such as the first lamp 210a, and the second reflector 240. The second lamp 250 includes a second lampshade 252 and a burner 254. The second lampshade 252 has a second light outputting section 252a, and the second burner 254 is disposed in the second lamp shade 252. The second burner 254 provides a second diverging light, and the second lampshade 254 transforms the second diverging light into a second parallel light beam 256. In addition, the third reflector 260 is disposed in front of the second light outputting section 252a of the second lampshade 252.

In the embodiment, a portion of the second parallel light beam 256 propagates to second reflector 240, and the other portion of the second parallel light beam 256 is reflected by the third reflector 260 to the first lamp 210a, and is further reflected by the first lamp shade 212 and the first reflector 216 of the first lamp 210a. In addition, the first parallel light beam 218 provided from the first lamp 210a and the portion of the second parallel light beam 256 re-reflected by the first lamp shade 212 and the first reflector 216 of the first lamp 210a are reflected by the third reflector 260 and the second lampshade 252 to the second reflector 240. Then, the second reflector 240 reflects the second parallel light beam 256 and the first parallel light beam 218 from the first lamp 210b, so that both the parallel light beams are combined to form the parallel illumination beam 220.

Since the illumination systems 200a and 200a' have three lamps, that each of the illumination systems 200a and 200a has, two first lamps 210a and 210b and the second lamp 250, the parallel illumination beam 220 provided by the illumination systems 200a and 200a' has stronger intensity.

Figure 5:
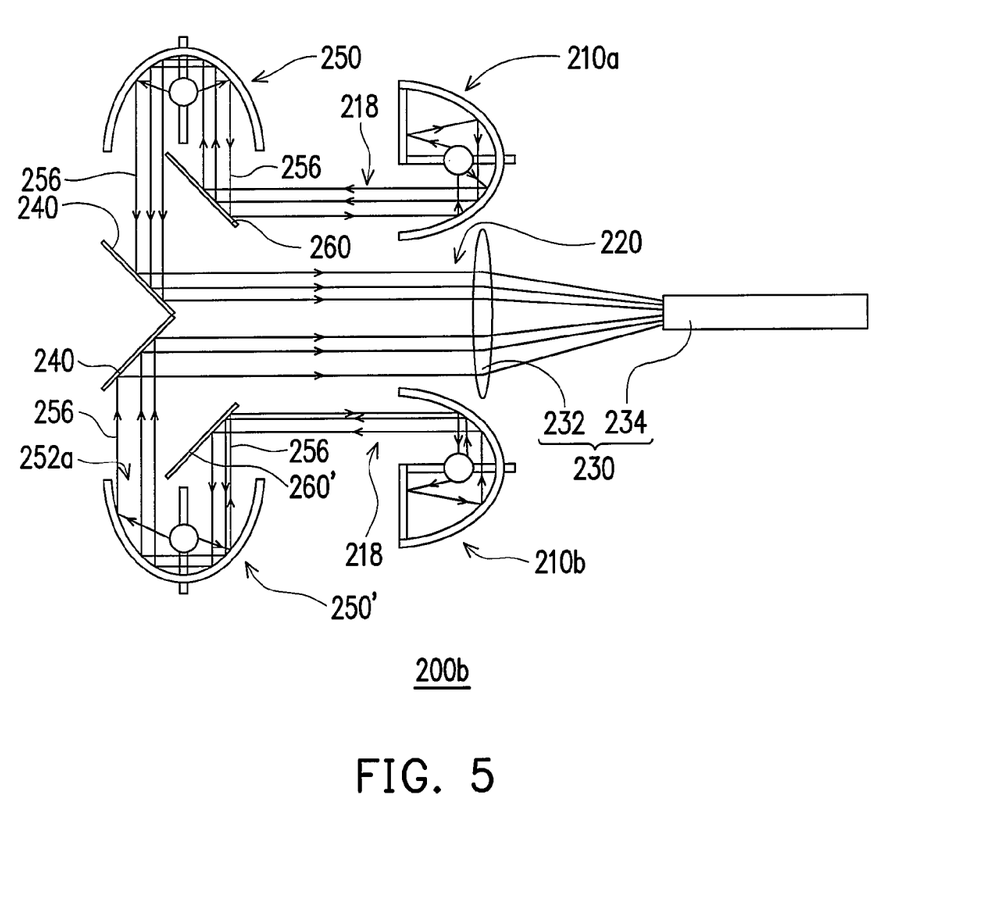
FIG. 5 is a schematic illustration showing further another structure of an illumination system according to the first embodiment of the invention.

Referring FIG. 5, an illumination system 200b in the embodiment is similar to the illumination system 200a' as shown in FIG. 4B, and the difference is that the illumination system 200b further includes a second lamp 250' and a third reflector 260'. The second lamp 250' is disposed between the first lamp 210b and the lower reflector 240 in FIG. 4B. The third reflector 260' is disposed in front of the light outputting section 252a of the second lamp 250'. In the illumination system 200b, since the propagation paths of the first parallel light beam 218 and the second parallel light beam 256, provided by the first lamp 210b and the second lamp 250' are similar to the propagation paths of the first parallel light beam 218 and the second parallel light beam 256, provided by the first lamp 210a and the second lamp 250, the detail is not further described.

Since the illumination system 200b' of the embodiment has four lamps, that are two first lamps 210a and 210b as well as two second lamps 250 and 250', the intensity of the parallel illumination beam 220 is further improved.

Second Embodiment

Figure 6:
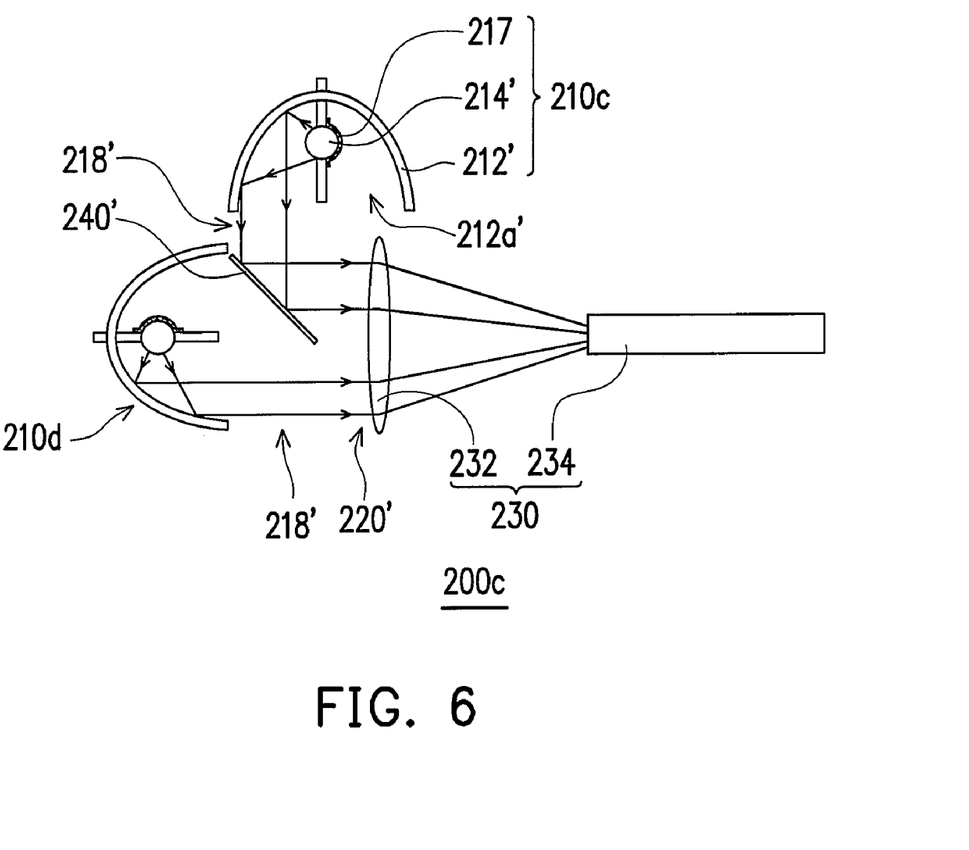
FIG. 6 is a schematic illustration showing a structure of an illumination system according to a second embodiment of the invention.

Referring to FIG. 6, an illumination system 200c of the embodiment is similar to the illumination system of the first embodiment, and the like numerals represent the like elements in FIG. 6. The illumination system 200c of the embodiment includes two lamps 210c and 210d and a reflector 240' disposed between the lamps 210c and 210d. Each of the lamps 210c and 210d includes a lampshade 212', a burner 214' and a light covering member 217. The lampshade 212' has a light outputting section 212a' and the burner 214' is disposed inside the lampshade 212'. The light covering member 217 encloses a portion of the burner 214'. The burner 214' provides a diverging light and the lampshade 212' transforms the diverging light into a parallel light beam 218'. The parallel light beam 218' is output from a portion of the light outputting section 212'. In addition, the reflector 240' is disposed in front of the light outputting section 212' of one of the lamps, such as the lamp 210c, and is on the optical path of the parallel light beam 218' from the first lamp 210c. The parallel light beam 218' provided by the first lamp 210c is reflected by the reflector 240', and then is combined with the parallel light beam 218' provided by the lamp 210d, so as to form a parallel illumination beam 220'.

The light covering member 217 is, for example, a coating layer. The material of the coating layer is, for example, the material capable of absorbing the energy of the ultraviolet light and infrared light, so as to prevent the damage on the burner 214 due to overheat. In addition, in the embodiment, a light condenser 230 is disposed at the optical path of the parallel light beam 220', so as to transform the parallel light beam 220' into a focused illumination beam. The light condenser 230 is, for example, a lens 232, an optical integration rod 234 or a combination thereof. The advantages of the illumination system 200c of the embodiment are similar to the advantages of the illumination system 200 of the first embodiment, as for example shown in FIG. 2, and are not further described.

In summary, the invention at least includes the advantages as follows:

1. Since the invention uses the reflector and/or the light covering member to reduce a portion of the ultraviolet light and infrared light in the lampshade, it reduces the probability of damage on the burner due to overheat.

2. Since the illumination system has smaller structure, the length of the optical path for the light beam is less, and therefore the light beam is not easily diverged. The light condensing efficiency of the light beam is improved, so as to increase the intensity of the parallel illumination beam, provided from the illumination system. In addition, the illumination system has smaller structure so that the total volume of a projection apparatus is smaller.

3. Since the number of the lamps is properly increased according to the actual need on the illumination system, the intensity of the parallel illumination beam is improved.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. An illumination system, suitable for providing a parallel illumination beam, the illumination system comprising:

two first lamps, each of the first lamps comprising:

a first lampshade, having a first light outputting section;

a first burner, disposed in the first lampshade, the first burner providing a first diverging light;

a first reflector, connected with the first lampshade and covering a portion of the first light outputting section, wherein the first lampshade and the first reflector transform the diverging light into a first parallel light beam, and the first parallel light beam is emitted from a portion of the first light outputting section without covering by the first reflector;

at least one second reflector, disposed between the first lamps to reflect and combine the first parallel light beams into the parallel illumination beam;

at least one second lamp, disposed between at least one of the first lamps and the second reflector, wherein the second lamp comprises:

a second lampshade, having a second light outputting section;

a second burner, disposed in the second lampshade, the second burner providing a second diverging light and the second lampshade transforming the second diverging light into a second parallel light beam; and at least one third reflector, disposed in front of the second light outputting section of the second lampshade, wherein a portion of the second parallel light beam is reflected by the third reflector to one of the first lamps, the other portion of the second parallel light beam propagates to the second reflector, and a portion of the first parallel light beams is reflected to the second reflector by the third reflector and the second lampshade.

2. The illumination system of claim 1, wherein axes of the first burners of the first lamps are perpendicular to each other.

3. The illumination system of claim 1, wherein the second reflector includes a mirror or a prism.

4. The illumination system of claim 3, wherein the mirror comprises a cold mirror or a dichroic mirror.

5. The illumination system of claim 1, further comprising a light condenser, disposed on an optical path of the parallel illumination beam.

6. The illumination system of claim 5, wherein the light condenser comprises a lens, an optical integration rod, or a combination of the lens and the optical integration rod.

* * * * *